March 28, 1961 J. J. SPICER, JR 2,977,435
TURN SIGNAL SWITCH
Filed June 22, 1959
3 Sheets-Sheet 1
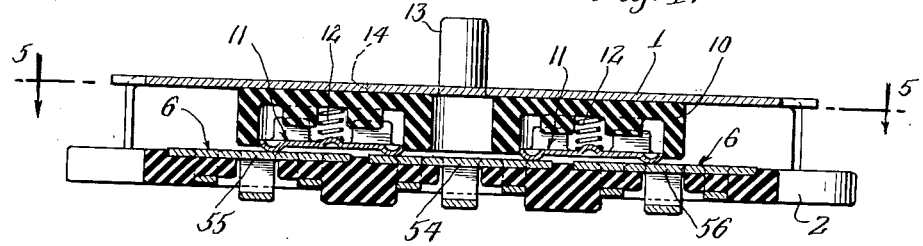
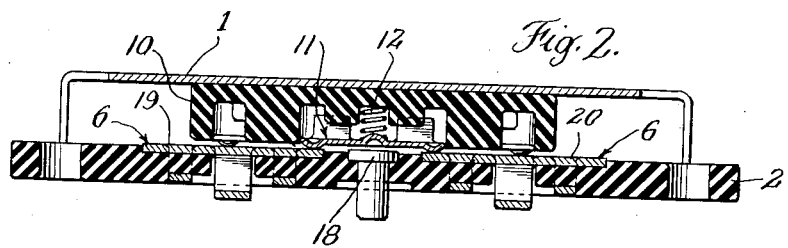
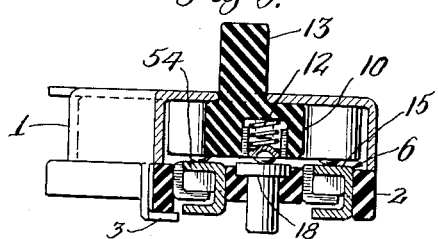
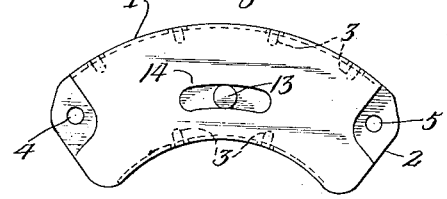
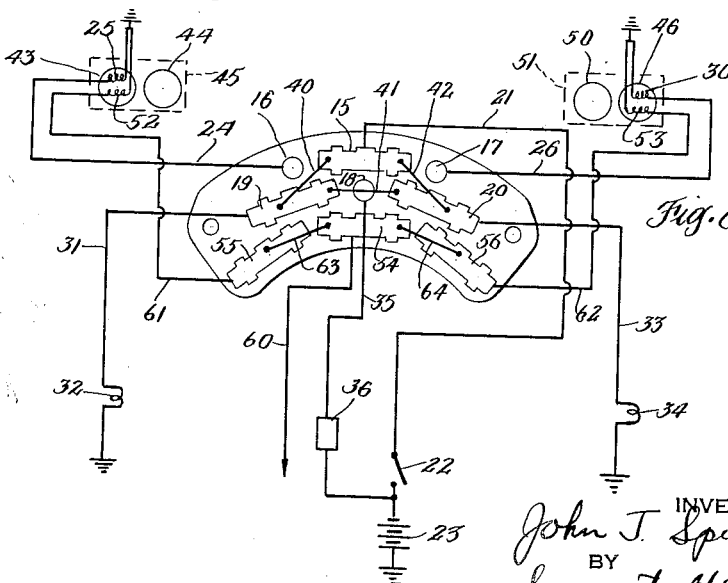
INVENTOR
John J. Spicer Jr.
BY
Synnestvedt & Lechner
ATTORNEYS March 28, 1961     J. J. SPICER, JR     2,977,435
TURN SIGNAL SWITCH
Filed June 22, 1959     3 Sheets-Sheet 2

INVENTOR
John J. Spicer Jr.
BY
Synnestvedt & Lechner
ATTORNEYS

March 28, 1961  J. J. SPICER, JR  2,977,435
TURN SIGNAL SWITCH
Filed June 22, 1959  3 Sheets-Sheet 3

INVENTOR
John J. Spicer Jr.
BY
Synnestvedt & Lechner
ATTORNEYS

United States Patent Office 2,977,435
Patented Mar. 28, 1961

2,977,435

TURN SIGNAL SWITCH

John J. Spicer, Jr., Philadelphia, Pa., assignor to Novo Industrial Corporation, a corporation of New York Filed June 22, 1959, Ser. No. 822,137

4 Claims. (Cl. 200—61.27)

This invention relates to control switches and in particular relates to a control switch for vehicle turn indicating systems.

Many of the modern day passenger cars are equipped with dual headlights, that is to say, a pair of headlights on each side of the car, one of each pair being called a high beam light and the other of each pair being called a low beam light. A common arrangement contemplates that both lights be constantly energized (assuming night driving) with the high beams being turned off either manually or automatically at the approach of an oncoming car.

The present invention contemplates turn signal indicating equipment for use with such headlight arrangement, for example, that the filaments for the front left and right turn indicating lights be disposed within the reflectors for the high beam lights and that when a turn is to be made that the high beam lights (left or right) be turned off at the same time and during the period that the turn indicating light is flashing.

For the above purpose the invention contemplates a turn signal control switch which not only controls the turn signal lights for operation in the normal manner, but in addition, controls the high beam lights so that when the turn signal system is not conditioned for indicating a turn the high beam lights will operate in the normal fashion, but when a turn signal is to be indicated, the high beam lights for the particular selected side will be de-energized.

The manner in which the invention is preferably constructed will be apparent from the following description and drawings wherein:

Figure 1 is a longitudinal section taken on the line 1—1 of Figure 5;

Figure 2 is a longitudinal section taken on the line 2—2 of Figure 5;

Figure 3 is a cross section taken on the line 3—3 of Figure 5;

Figure 4 is a reduced plan view of the switch of Figures 1-3;

Figure 8 is a schematic diagram showing certain of the circuitry for the vehicle turn indicating lights and also the vehicle high beam lights;

Figure 5:
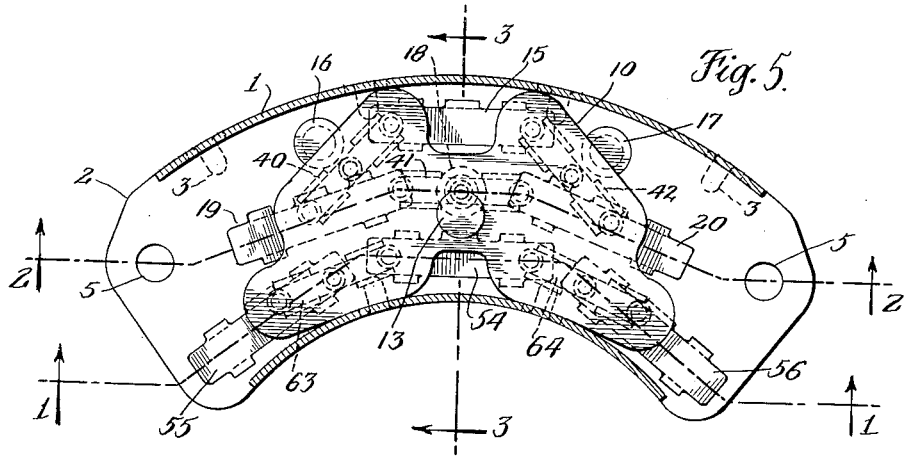
Figure 5 is a plan section taken substantially on the line 5—5 of Figure 1 and showing certain of the components of the switch in the neutral or non-turn indicating position.
Figure 6:
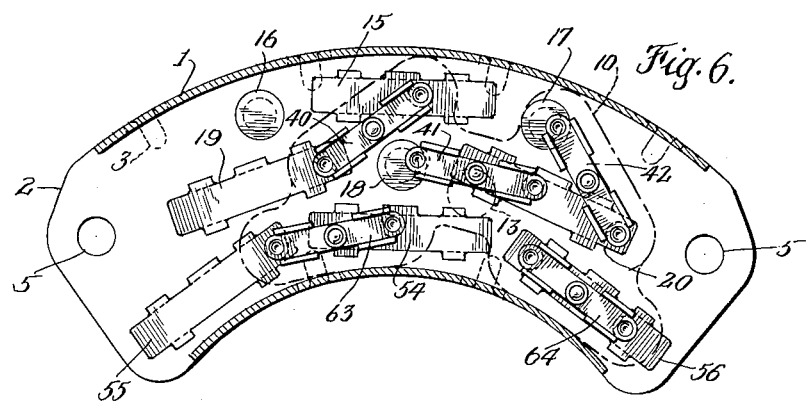
Figure 6 is a view similar to Figure 5 except that it shows certain components of the switch in the right-hand turn indicating position.
Figure 9:
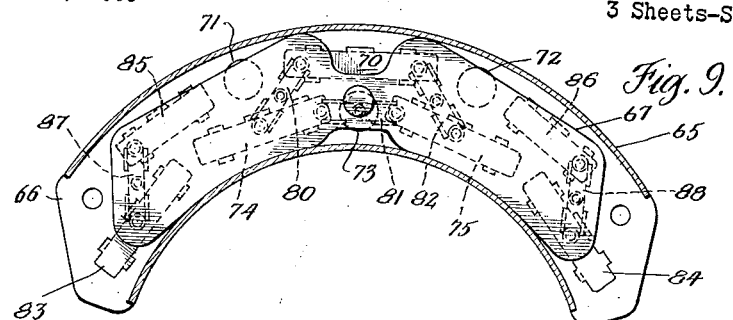
Figure 10:
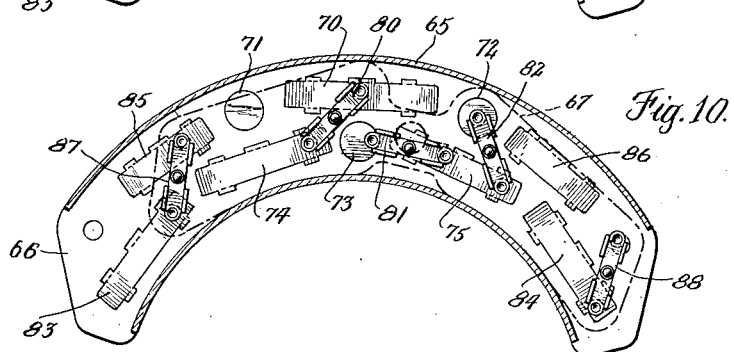
Figure 11:
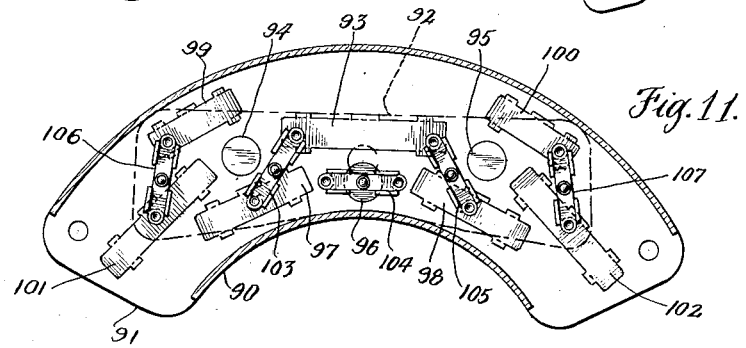
Figure 12:
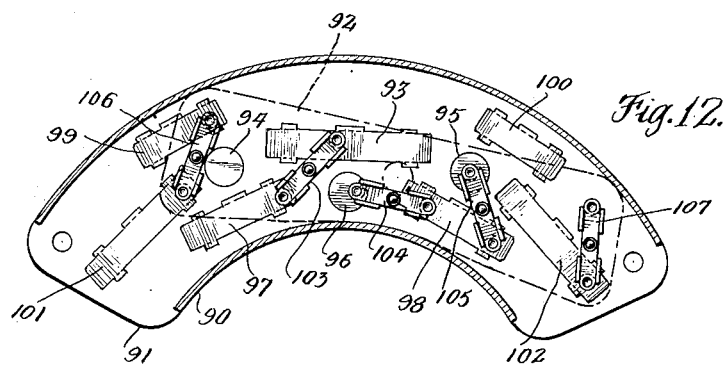

Figures 9 and 10 are views similar to Figures 5 and 6 and illustrating a modification of the invention, particularly in the arrangement of certain of the fixed and movable terminals or contacts; and Figures 11 and 12 are views similar to Figures 5 and 6 but illustrating another modification of the invention, particularly in the arrangement of certain of the fixed and movable electrical contacts.

In Figure 1 a housing 1, preferably made of metal, is secured to a base 2 which is preferably made of insulating material. As indicated in Figure 4 both the housing and base are somewhat arcuate in shape with the housing being secured to the base by means of the bent-over tabs 3. The base 2 is provided with apertures 4 and 5 by means of which the switch is adapted to be mounted in association with the turn indicating selector mechanism.

Disposed on the base of the housing are a plurality of fixed terminals 6, which as indicated in Figures 1-3, are substantially flush with the top of the base, the shape and purpose of which will be described shortly. Within the housing there is a carrier 10 having a plurality of contacts or bridging connectors 11 which are urged downwardly toward the fixed terminals 6 by the springs 12. These bridging connectors interconnect the fixed terminals in accordance with the position of the carrier for controlling both the turn indicating system and the high beam lights as will be explained later.

The carrier has three positions, one, a neutral position and two settable or turn indicating positions on either side of neutral. In Figures 1 and 5 the carrier is shown to be in the neutral position. In Figure 6 the carrier has been moved to the right to the right-hand turn indicating position and in Figure 7 the carrier has been moved to the left to the left-hand turn indicating position. The carrier is adapted to be moved by means of the stud 13 which is a part of or fixed to the carrier and projects through an arcuate slot 14 in the top of the housing 1. The stud 13 is adapted to be connected with the linkage of the turn indicating selector mechanism for movement of the carrier from neutral to either turn indicating position and from a turn indicating position back to neutral.

The relative disposition of the various fixed terminals and bridging connectors mentioned above is best seen in Figures 5-8. The terminal 15 is generally elongated and is disposed between two round terminals 16 and 17. The terminal 18 is round, similar to the terminals 16 and 17 and is disposed between the two elongated terminals 19 and 20 which are similar to the terminal 15. The terminals 15-20 are for controlling the vehicle turn indicating system as is indicated in Figure 8. The terminal 15 is connected by a line 21 to the stop light switch 22 which in turn is connected to the battery or generator 23. The terminal 16 is connected by a line 24 to the left front turn indicating light 25. The terminal 17 is connected by a line 26 to the right front turn indicating light 30. The terminal 19 is connected by a line 31 to the left rear turn indicating light 32. The terminal 20 is connected by a line 33 to the right rear turn indicating light 34. The terminal 18 is connected by a line 35 to the flasher 36 which is in turn connected to the generator 23. The flasher 36 provides a source of periodic current for flashing the various turn indicating lights.

The bridging connectors for interconnecting the various terminals 16-20 are indicated at 40, 41 and 42 and it will be seen that each of these is elongated and identical in shape.

In the neutral position of the carrier, as indicated in Figure 5 and in Figure 8, the bridging connector 40 interconnects the terminals 15 and 19. The bridging connector 41 interconnects the terminals 19 and 20 and the bridging connector 42 interconnects the terminals 15 and 20. In this position it will be apparent that if the stop light switch 22 is closed, current will be fed to the line 21, terminal 15, bridging connectors 40 and 42, lines 31 and 33 to the rear turn indicating lights 32 and 34 which, in the usual vehicle turn indicating system, serve as both turn indicating lights and as stop lights.

When the carrier is moved to the right-hand turn indicating position it will be seen that the bridging connector 40 maintains the connection between the terminals 15 and 19. The bridging connector 41 interconnects the terminals 18 and 20 and the bridging connector 42 interconnects the terminals 17 and 20. Periodic current from the flasher 36 is fed to the terminal 18 through bridging connector 41 to terminal 20. From the terminal 20 the current is fed through line 33 to the rear light 34 and also from the terminal 20 through the bridging connector 42, terminal 17 and line 26 to the front right indicating turn signal light 30. The lights 30 and 34 both flash or blink to indicate a right-hand turn. It will be observed that in the right-hand position with closure of the stop light switch current will still be fed to the left rear light 32.

Figure 7:
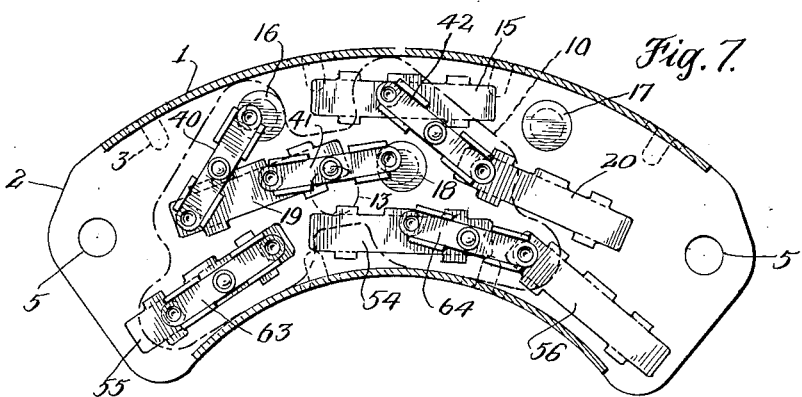
Figure 7 is a view similar to Figure 5 except that it shows certain of the components of the switch in the left-hand turn indicating system.

As indicated in Figure 7 when the carrier is turned to the left-hand turn indicating position the bridging connector 40 interconnects the terminals 16 and 19, the bridging connector 41 interconnects the terminals 18 and 19 and the bridging connector 42 interconnects the terminals 15 and 20. In this position, periodic current is fed from the flasher 36, terminal 18, bridging connector 41 and to the terminal 19. From the terminal 19 the periodic current is fed to line 31 to the left rear light 32 and from the terminal 19 through the bridging connector 40 to the terminal 16 and line 24 to the left front light 25 so that both of the lights 25 and 32 flash to indicate a left-hand turn. In this position if the stop light switch is closed the rear right light 34 will still receive power.

With reference to Figure 8, it will be observed that the light 25 is disposed within the reflector 43 for the left high beam light (the reflector for the left low beam light is indicated at 44). Both of the reflectors are disposed within a casing generally indicated at 45. The right front turn indicating light 30 is disposed within the reflector 46 for the right high beam light (the left low beam light reflector is indicated at 50). Both of the reflectors are disposed within the casing indicated at 51. The high beam reflector 43 also includes the left high beam light 52 and the reflector 46 also includes the right high beam light 53. The lights 52 and 53 are adapted to be controlled by the turn signal switch as explained following.

The plurality of terminals 6 includes terminal means comprising the elongated terminal 54 and also the elongated terminals 55 and 56 disposed on either side of the terminal 54. These terminals 54, 55 and 56 are similar in size and shape to the terminals 15, 19 and 20. As is clearly apparent the axes of the terminals 54, 55 and 56 are all disposed along a common line or axis which in the particular embodiment shown is somewhat arcuate in shape. The terminal 54 is connected by a line 60 to a source of supply for energizing the high beam lights 52 and 53. The terminal 55 is connected by a line 61 to the left high beam light 52 and the terminal 56 is connected by a line 62 to the right high beam light 53.

The terminals 54, 55 and 56 are adapted to be interconnected by bridging connector means comprising the bridging connectors 63 and 64 which are similar in size and shape to the bridging connectors 40-42.

In the neutral position of the carrier it will be seen that the bridging connector 63 interconnects the terminals 54 and 55 while the bridging connector 64 interconnects the terminals 54 and 56. It will be apparent, therefore, that when the carrier is in the neutral position the power from the line 60 may be fed to both of the high beam lights 52 and 53 as determined by switching mechanism (not shown) operated either manually or automatically.

When the switch is turned to the right-hand turn indicating position, as shown in Figure 6, it will be seen that the bridging connector 63 maintains the contact between the terminals 54 and 55 and the bridging connector 64 breaks the contact between the terminals 54 and 56. Power, therefore, cannot be supplied to the right high beam light 53 and the same is de-energized. However, with the bridging connector 63 maintaining the connection between the terminals 54 and 55, the left-hand high beam light 52 is free to be energized.

When the switch is turned to the left-hand turn indicating position, as shown in Figure 7, it will be seen that the bridging connector 64 maintains the contact between the terminals 54 and 56 while the bridging connector 63 breaks the connection between the terminals 54 and 55. Under these conditions, therefore, it will be observed that the left high beam light 52 cannot be energized while the right-hand high beam light 53 is free to be energized.

In Figures 9 and 10 I have shown a modification of the invention wherein the housing 65 is somewhat narrower and also more elongated than the housing 1 of Figures 1, 2, etc. On the bottom of the housing 65 there is secured the base 66 carrying a plurality of fixed terminals and within the housing there is disposed the carrier 67 which is of a shape consistent with the shape of the housing. Disposed on the base 66 is the elongated terminal 70 and on either side of the elongated terminal are the round terminals 71 and 72. Adjacent the terminals 70, 71 and 72 is the terminal 73 which is round and on either side of the terminal 73 are the elongated terminals 74 and 75. The terminals 70, 71 and 72 correspond to the terminals 15, 16 and 17 mentioned in connection with Figure 8, while the terminals 73, 74 and 75 correspond to the terminals 18, 19 and 20 also mentioned in connection with Figure 8. The group of terminals 70-75 are adapted to be connected in the vehicle turn indicating system in the same manner as the respective corresponding terminals of Figure 8 and function in the same manner.

The carrier mounts the bridging connector means comprising the connectors 80, 81 and 82 which correspond to the bridging connectors 40, 41 and 42 mentioned in connection with Figure 8. The connectors 80 and 81 function to interconnect the terminals 70-75 in the same manner as the connectors 40, 41 and 42.

Also mounted on the base 66 is the terminal means comprising the terminals 83, 84, 85 and 86. The terminals 83 and 84 are adapted to be electrically interconnected together by conductor means (not shown) and also to a source of power for the high beam lights such as the line 60 of Figure 8. The terminals 83 and 84 correspond then to the terminal 54 mentioned in connection with Figure 8. As will be apparent, the axes of the terminals 83 and 84 lie along a line or axis which in the embodiment illustrated is arcuate in shape. The terminal 85 is adapted to be connected to the left high beam light, for example, the light 52, and the terminal 86 is adapted to be connected to the right high beam light, for example, the light 53. The axes of the terminals 85 and 86 lie along an axis which is generally parallel the axes of the terminals 83 and 84. The terminals 83 and 85, and 84 and 86 are adapted to be interconnected by the bridging connector means comprising the connectors 87 and 88.

In Figure 9 the carrier 67 is in the neutral position and it will be seen that the bridging connector 87 interconnects the terminals 83 and 85 and the bridging connector 88 interconnects the terminals 84 and 86. Thus in this position it will be observed that power from the terminals 83 and 84 can flow through the bridging connectors 87 and 88 to the terminals 85 and 86 so that the left and right high beam lights can be energized as desired.

In Figure 10 the carrier 67 is shown in the right-hand turn indicating position and here it will be seen that the bridging connector 87 maintains the connection between the terminals 83 and 85 while the bridging connector 88 breaks the connection between the terminals 84 and 86. Since the terminal 86 is connected to the right-hand high beam light, the same cannot be energized. However, with the connection between the terminals 83 and 85 being maintained, the left-hand beam light is free to be energized as desired. When the carrier is moved from neutral to the left-hand turn indicating position, the connector 88 maintains the contact between the terminals 84 and 86 so that the right high beam light is free to be energized and the bridging conector 87 breaks the connection between the terminals 83 and 85 so that the left high beam light cannot be energized.

In Figure 11 I have shown a further modification of the invention including a housing 90 having a base 91 and a carrier 92.

The terminals 93–98 respectively correspond to the terminals 16–20 of Figure 8 and are adapted to be connected to the same parts of the turn indicating system and function in the same manner as the terminals 16–20. The terminal means comprising the terminals 99 and 100 are adapted to be connected together by conductor (not shown) and also interconnected to a source of supply for the high beam lights such as the line 60 of Figure 8. The axes of the terminals 99 and 100 lie along an arcuate line or axis. The terminal means comprising the terminals 101 and 102 are respectively adapted to be connected to the left and right high beam lights, for example, the lights 52 and 53. The axes of the terminals 101 and 102 lie along an axis which is generally parallel with the axes for the terminals 99 and 100. The carrier 92 mounts the bridging connectors 103, 104 and 105 which are adapted to interconnect the terminals 93–98 and function in the same manner as the bridging connectors 40, 41 and 42. The carrier also has bridging connector means comprising the bridging connectors 106—107 which respectively interconnect the terminals 99 and 101, and 100 and 102.

In the neutral position of the carrier 92 as shown in Figure 11, it will be seen that the bridging connector 106 interconnects the terminals 99 and 101 and the bridging connector 107 interconnects the terminals 100 and 102. Thus power from the terminals 99 and 100 can be fed to the high beam lights.

When the carrier is moved to the right-hand position as shown in Figure 12, the bridging connector 106 maintains the connection between the terminals 99 and 101 while the bridging connector 107 breaks the connection between the terminals 100 and 102. Thus, while the left high beam light is free to be energized, the right-hand high beam light is de-energized. When the carrier moves from neutral to the left-hand position, the bridging connector 107 maintains the connection between the terminals 100 and 102 and the connector 106 breaks the connection between the terminals 99 and 101 so that the right-hand high beam light is free to be energized while the left-hand high beam light is de-energized.

I claim:

1. In a vehicle turn indicating system: a base; a first pair of fixed terminals on said base to be connected respectively to the left-hand front and rear turn signal lights of the vehicle; a second pair of fixed terminals on said base to be connected respectively to the right-hand front and rear turn signal lights; power terminal means on said base to be connected with a source of periodic current; mechanism including a carrier slidable over said base for selectively connecting said pairs with said power terminal means, the carrier having a neutral position and two settable turn indicating positions, in the neutral position both of said pairs being disconnected from said power terminal means and in either settable position the one pair being connected with and the other pair being disconnected with said power terminal means; first fixed terminal means on said base to be connected with a source of current; second fixed terminal means on said base to be connected to the left high beam lights of a vehicle; third fixed terminal means on said base to be connected to the right high beam lights of a vehicle; and bridging connector means comprising two electrically independent bridging connectors mounted in said carrier and constructed so that when the carrier is in said neutral position the bridging connectors respectively connect said first terminal means with said second and third terminal means and in the left-hand settable position the bridging connectors respectively disconnect the first terminal means with the third terminal means while maintaining the connection between the first terminal means and the second terminal means, and when the bridging connector is in the right-hand settable position the bridging connectors respectively disconnect the first terminal means with the second terminal means and maintain the connection between the first terminal means and the third terminal means.

2. A construction in accordance with claim 1 wherein said first, second and third terminal means are each independent terminals and each lies along an axis with the second and third terminal being disposed on opposite sides of the first terminal.

3. A construction in accordance with claim 1 wherein said first terminal means comprises two independent terminals lying along a first axis and the second and third terminal means comprise independent terminals lying along an axis spaced from said first axis.

4. A contruction in accordance with claim 1 wherein both of said axes are arcuate and are substantially parallel one another.

References Cited in the file of this patent

UNITED STATES PATENTS 2,010,741    Sullender  ---------------- Aug. 6, 1935
2,714,140    Spicer  ------------------- July 26, 1955